United States Patent
Fukasaku

[11] Patent Number: 5,891,510
[45] Date of Patent: Apr. 6, 1999

[54] METHOD FOR MANUFACTURING A HYDROGEN STORAGE ALLOY ELECTRODE

[75] Inventor: Hiroshi Fukasaku, Kariya, Japan

[73] Assignee: Kabushiki Kaisha Toyoda Jidoshokki Seisakusho, Kariya, Japan

[21] Appl. No.: 902,439

[22] Filed: Jul. 29, 1997

[30] Foreign Application Priority Data

Jul. 31, 1996 [JP] Japan ................................. 8-201505

[51] Int. Cl.$^6$ ....................................................... B05D 5/12
[52] U.S. Cl. ............................ 427/58; 29/623.5; 427/370; 427/388.4
[58] Field of Search ................ 29/623.5; 427/58, 427/370, 388.4

[56] References Cited

U.S. PATENT DOCUMENTS

| | | | |
|---|---|---|---|
| 5,543,250 | 8/1996 | Yanagihara et al. | 429/246 |
| 5,554,459 | 9/1996 | Gozdz et al. | 29/623.5 X |
| 5,691,085 | 11/1997 | Coco et al. | 29/623.5 X |

FOREIGN PATENT DOCUMENTS

| | | |
|---|---|---|
| 4284354 | 10/1992 | Japan . |
| 745278 | 2/1995 | Japan . |

*Primary Examiner*—Michael Lusignan
*Attorney, Agent, or Firm*—Morgan & Finnegan, L.L.P.

[57] ABSTRACT

The present invention relates a method for manufacturing a hydrogen storage alloy electrode that can prevent the peeling-off of a hydrogen storage alloy powder and can decrease both the electric resistance and the cell reaction resistance of the electrode coated with SBR. A method for manufacturing a hydrogen storage alloy electrode comprises the steps of mixing a powder of a hydrogen storage alloy with styrene-butadiene base latex and water and kneading the mixture so as to form a paste, and after coating the paste on a current collector, drying and pressing the current collector, wherein the styrene-butadiene base latex has a glass transition temperature in a range of −25° to −40° C. Thereby, it is possible to prevent the peeling of the hydrogen storage alloy powder and to decrease both the electric resistance and the cell reaction resistance of the electrode coated with the SBR.

3 Claims, 2 Drawing Sheets

METHOD FOR MANUFACTURING A HYDROGEN STORAGE ALLOY ELECTRODE

BACKGROUND OF THE INVENTION

1. Field of the Invention

The present invention relates to a hydrogen storage alloy electrode and a method for manufacturing it.

2. Description of the Related Art

A paste for a hydrogen storage alloy, used for manufacturing a hydrogen storage alloy electrode for a negative electrode of a nickel-hydrogen secondary battery, is formed by mixing a hydrogen storage alloy powder with various polymer materials, including a conductive powder material, a binding material or a thickening material, with water and by kneading the mixture.

Binding materials are polymer materials for mainly increasing bonding strength between hydrogen storage alloy particles or between hydrogen storage alloy particles and a metallic plate used as a current collector. Further, the thickening materials are polymer materials that increase the viscosity of the paste to ensure an adhesive thickness. In Japanese Unexamined Patent Application No. 4-284354, it is shown to employ more than two materials selected from styrene-butadiene base latex (SBR), fluorine resin (PTFE) and a hydrophilic resin (methyl cellulose) for a paste of hydrogen storage alloy powder and, in Japanese Unexamined Patent Application No. 7-45278, to employ SBR and methyl cellulose for a paste of hydrogen storage alloy powder.

SUMMARY OF THE INVENTION

A styrene-butadiene base latex as the above binding material is a highly elastic material compared with highly rigid materials such as PTFE and has an increased peeling resistance of hydrogen storage alloy powder because the deformation of the latex is obtained in a direction which prevents the hydrogen storage powder from being peeled when the latex is subjected to deformation when a hydrogen charge or hydrogen discharge is done. As a result, it is expected that service life of the electrode storage capacity can be extended.

A styrene-butadiene base latex is necessary to prevent the peeling of hydrogen storage alloy powder. However, because styrene-butadiene base latex is an electrical insulating material, the latex has defects that both electric resistance and cell reaction resistance of the electrode are increased and that, especially at a high discharge, a decrease in electrode storage capacity results. However, if the addition of the binding materials is decreased, it results in an increase in the peeling of the hydrogen storage alloy powder and a decrease in the service life of a nickel-hydrogen secondary battery made of such a material.

Therefore, it is desired to decrease the addition of a styrene-butadiene base latex as well as to prevent the peeling of hydrogen storage alloy powder, and to decrease the resistance of the above electrode.

The present invention solves the above problems. Thus, the present invention provides a method for manufacturing a hydrogen storage alloy electrode that prevents peeling of hydrogen storage alloy powder and decreases both the electric resistance and the cell reaction resistance of the electrode coated with SBR.

In accordance with one embodiment of the present invention, a method for manufacturing a hydrogen storage alloy electrode comprises the steps of mixing a powder of a hydrogen storage alloy with styrene-butadiene base latex as a binding material and water and kneading the mixture so as to form a paste, and after coating the paste on a metallic plate as a current collector, drying and pressing the current collector, wherein the styrene-butadiene base latex has a glass transition temperature in a range of −25° to −40° C.

In accordance with the above method, a styrene-butadiene base latex can provide an increase in the binding strength of hydrogen storage alloy powder. Thereby, it is possible to prevent the peeling of hydrogen storage alloy powder as well as to decrease both the electric resistance and the cell reaction resistance of an electrode.

The details of the present invention are explained as follows.

The present inventor noted that, since a styrene-butadiene base latex is a copolymer consisted of a styrene and a butadiene, and the properties of the latex can be changed by varying the ratio of these agents, i.e., the composition of these agents, it is thereby possible to change the binding force between a styrene-butadiene base latex and hydrogen storage alloy powder.

The inventors of this invention have conducted tests as to peeling performance by changing the ratios of the latex, which were not done previously, and have found that a desired range of composition (the ratio of styrene and butadiene) of styrene-butadiene base latex can prevent hydrogen storage alloy powder from being peeled-off, while reducing the use of the amount of styrene-butadiene base latex.

Thus, in accordance with the present invention, it is possible to reduce the peeled-off amount of hydrogen storage alloy powder per weight of the SBR and, even if the quantity of SBR used is reduced, the same value of binding force can be obtained as in the prior art. Thereby, since the quantity of SBR used can be reduced, the electrode resistance can also be reduced.

In accordance with another embodiment of the present invention, the quantity of SBR used can be reduced considerably according to a method for manufacturing a hydrogen storage alloy electrode, wherein a styrene-butadiene base latex has a glass transition temperature in a range of −28° to −37° C.

Further, in another embodiment of the method according to the present invention, a styrene-butadiene base latex is added in a quantity of 0.5 to 1 wt% based on that of the hydrogen storage alloy powder. In accordance with the present invention, such a small quantity of the latex can prevent the peeling of hydrogen storage alloy powder.

Further, in another embodiment of the present invention, a method for manufacturing a hydrogen storage alloy electrode comprises adding at least one fluorine resin material as a binding material and a hydrophilic polymer material as a thickening material.

The preferable embodiments of the present invention will be explained.

Figure 1:
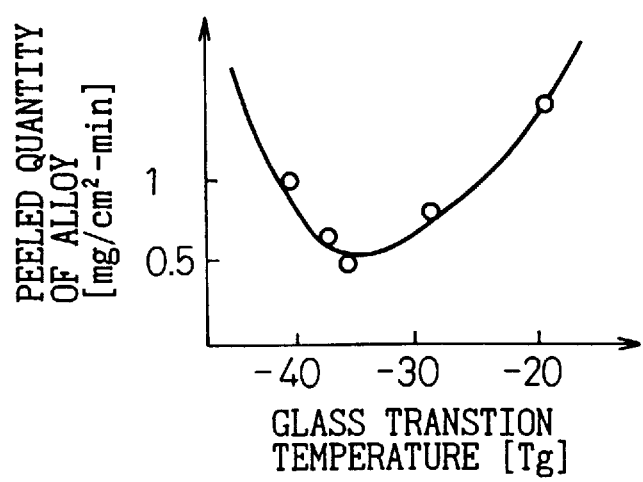
FIG. 1 is a characteristic curve of the relation between glass transition temperature and the peeled quantity of a hydrogen storage alloy powder.

Misch metal base materials are suitable materials as hydrogen storage alloy powder and further, for example, Zr base or Ti-Mn base materials can be used instead of misch metal base materials. The average grain size of hydrogen storage alloy powder can be 10 to 150 μm in diameter. When the average grain size of the powder is less than 10 μm, the manufacturing cost increases, while the reaction surface area of a hydrogen storage alloy electrode is small when the average grain size of the powder is greater than 150 μm. The surface of a hydrogen storage alloy powder is coated with a good conductive metallic film and thereby the powder can be micro-capsulated with the film. It is possible to use nickel, copper, palladium and cobalt as the metallic film. A weight of the metallic film can be 0.5 to 15 wt %, preferably 0.5 to 5 wt % based on that of a hydrogen storage alloy powder.

It is possible to use a binding agent that contains fluorine resin such as a polytetrafluoroethylene (PTFE) and the like with a styrene-butadiene base latex (SBR) and others. Polytetrafluoroethylene (PTFE) inhibits the volume change of hydrogen storage alloy powder by charging or discharging hydrogen in the hydrogen storage alloy powder and, by the bonding between the powder and PTFE, prevents the peeling of the powder accompanying a volume change. Since a styrene-butadiene base latex (SBR) has a greater lastic modulus and can deform with the deformation of the hydrogen storage alloy powder, the hydrogen storage alloy powder can prevent the peeling of the powder from a current collector. Further, as a binding agent, FEP, PCTFE and the like fluorine resins can be used. The whole amount of the binding agent can be 0.1 to 4.0 wt % for that of hydrogen storage alloy powder, preferably 0.5 to 1.0 wt %. When the binding agent quantity is less than 0.1 wt %, the hydrogen storage alloy powder is likely subjected to peeling-off or thinning, which causes the hydrogen storage capacity (the service life of an electrode) of the powder to be reduced after prolonged use, thereby reducing the service life. When a binding agent is added in a quantity more than 4.0 wt %, the reduction of electrode capacity and the loss of internal electric resistance are remarkably increased.

A hydrophilic polymer material, as a thickening material, can be methyl cellulose, a carboxymethylcellulose and the like. The addition quantity of hydrophilic polymer materials can be 0.5 to 1.0 wt % based on that of the hydrogen storage alloy powder.

As for the materials of the current collectors, a perforated metal plate such a punching metal or an expanded metal, and forming nickel, a nickel wool and the like can be used.

DESCRIPTION OF PREFERRED EMBODIMENTS

The preferred embodiments of the present invention are explained according to the following and are based on examples.

EXAMPLE

A hydrogen storage alloy, having contents of $MmNI_{3.8}Co_{0.75}Al_{0.3}Mn_{0.35}$ (La/Mm=0.6) (where Mm is a misch metal material), was pulverized by a powdering machine, so that a powder state of hydrogen storage alloy material having a size of 200 mesh or less was obtained. A paste of a hydrogen storage alloy was prepared by mixing and stirring 76 wt % of hydrogen storage alloy powder, 4 wt % of nickel powder as conductive agents, 2 wt % of an emulsion of styrene-butadiene base latex having a solid part of 52 wt %, and 18 wt % of water solution of 2 wt % of methyl cellulose. However, as hereinafter described, by changing the glass transition temperature of a styrene-butadiene base latex, each sample of a paste of a hydrogen storage alloy was prepared at a different temperature in the transition temperature range.

Each sample of paste was placed in a container. A nickel plate as a current collector was soaked with the paste in the container and then was pulled up from the container charged with the sample of paste. After drying at 80° C. for 15 minutes, the nickel plate was pressed and thereby a hydrogen storage alloy electrode with an active material layer on both surfaces (thickness of 0.6 mm, width of 3 cm, length of 4 cm and alloy quantity of 0.275 g/cm$^2$) was made from the nickel plate.

In a water charged beaker that floated in a water bath of an ultrasonic generator unit, the main surface of each hydrogen storage alloy electrode was suspended vertically. The peeling quantity of the hydrogen storage alloy powder was measured using a 30 kHZ oscillation of an ultrasonic oscillator mounted at the bottom of the water bath of the ultrasonic generator unit.

FIG. 1 shows the result. As shown in FIG. 1, it was found that the glass transition temperature of a styrene-butadiene base latex is preferably in a temperature range of –25° C. to –40° C. and more preferably in a temperature range of –28° C. to –37° C.

Figure 2:
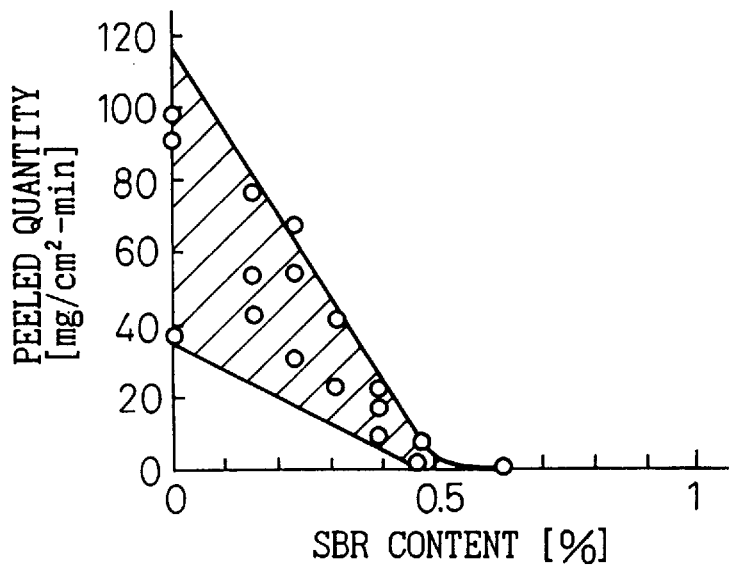
FIG. 2 is a distribution curve of the relation between SBR content and the peeled quantity of a hydrogen storage alloy powder.

Then, hydrogen storage alloy electrodes were made under conditions which are identical to those explained with reference to the above tests, except that a weight ratio of SBR, having a glass transition temperature of –35° C. with respect to the hydrogen storage alloy powder was variously changed. Then, the peeling of the hydrogen storage alloy powder was measured by performing the above ultrasonic oscillator testing. FIG. 2 shows the result. It was found that, as shown in FIG. 2, the peeling of hydrogen storage powder can be prevented, when SBR of more than 0.5 wt % based on the weight of hydrogen storage alloy powder is added to the powder.

Figure 3:
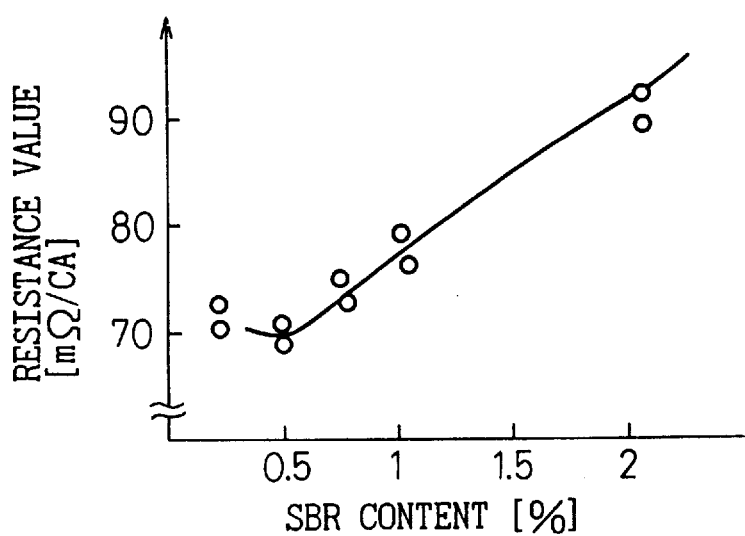
FIG. 3 is a characteristic curve of the relation between SBR content and electric resistance of a hydrogen storage alloy electrode.

Furthermore, hydrogen storage alloy electrodes were made under conditions which are identical to those explained with reference to the above tests, except that a weight ratio of SBR of a glass transition temperature of –35° C. with respect to the hydrogen storage alloy powder was variously changed, and then the electric resistances of the electrodes were measured. FIG. 3 shows the result. It is found that, as shown in FIG. 2, the increase of the electric resistance is proportional to the addition of SBR, when SBR more than 0.5 wt % based on the weight of hydrogen storage alloy powder is added to the powder.

It was found that, as shown in FIG. 2 and FIG. 3, an addition range of SBR is preferably in the range of 0.5 wt % to 1.0 wt %.

First a hydrogen storage alloy testing electrode of the present invention was made under conditions which are identical to those explained with reference to the above tests, except that 1.5 wt % addition of SBR, having a glass transition temperature of –35° C. with respect to the hydrogen storage alloy powder was variously changed. For making a comparison, second hydrogen storage alloy comparative electrodes were made under conditions which are identical to those explained with reference to the above tests, except that 1.5 wt % addition of SBR, having a glass transition temperature of –35° C. with respect to the hydrogen storage alloy powder was variously changed. Nickel-hydrogen secondary batteries, having a nominal capacity of 95 Ah(10 hR), were formed by employing the testing electrodes of the present invention and the comparative electrodes as a cathode electrode, and were formed by employing an anode electrode of a nickel hydroxide. The secondary batteries were charged at 0.1 C for 10 hours and then were discharged to 1 V at 0.2 C. The above testing cycle was repeated five times. Furthermore, after the secondary batteries were charged at 0.1 C for 10 hours and were discharged to DOD of 50% at 0.2 C, the power density of these batteries was measured (where DOD is the depth of discharge).

As a result, the batteries of the sample electrodes had power densities of 200 W/kg, while the batteries of the comparative electrodes had power densities of 175 W/kg. It is considered that such an increase in the power density originates from the decrease in both the electric resistance and the cell reaction resistance of the hydrogen storage alloy electrodes caused by a reduction of the added amount of SBR.

In the above testing condition, only SBR as a binding agent was added in the mixture. SBR can be added together with PTFE and the like in the mixture. In the present invention, it is obvious that the optimum temperature range of the glass transition temperature does not change by adding SBR with PTFE and the like.

I claim:

1. A method for manufacturing a hydrogen storage alloy electrode, comprising the steps of mixing a powder of a hydrogen storage alloy with styrene-butadiene base latex and water and kneading the mixture to form a paste, and after coating the paste on a current collector, drying and pressing the current collector, wherein said styrene-butadiene base latex has a glass transition temperature in the range of −25° to −40° C. and wherein the weight of said styrene-butadiene base latex in the mixture is 0.5 to 1 wt % with respect to the weight of said powder of a hydrogen storage alloy.

2. A method for manufacturing a hydrogen storage alloy electrode according to claim 1 wherein said styrene-butadiene base latex has a glass transition temperature in a range of −28 to −37° C.

3. A method for manufacturing a hydrogen storage alloy electrode according to claim 1, further comprising the step of adding at least one fluorine resin material as a binding material and a hydrophilic polymer material as a thickening material.

* * * * *